United States Patent
Park

(10) Patent No.: US 12,478,218 B2
(45) Date of Patent: Nov. 25, 2025

(54) BLENDER

(71) Applicant: LG ELECTRONICS INC., Seoul (KR)

(72) Inventor: Seungje Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 836 days.

(21) Appl. No.: 17/612,980

(22) PCT Filed: Aug. 6, 2020

(86) PCT No.: PCT/KR2020/010374
§ 371 (c)(1),
(2) Date: Nov. 19, 2021

(87) PCT Pub. No.: WO2021/029606
PCT Pub. Date: Feb. 18, 2021

(65) Prior Publication Data
US 2022/0211213 A1 Jul. 7, 2022

(30) Foreign Application Priority Data
Aug. 13, 2019 (KR) .................. 10-2019-0098859

(51) Int. Cl.
*A47J 43/07* (2006.01)
*A47J 43/046* (2006.01)
*A47J 43/08* (2006.01)

(52) U.S. Cl.
CPC ......... *A47J 43/0777* (2013.01); *A47J 43/046* (2013.01); *A47J 43/085* (2013.01)

(58) Field of Classification Search
CPC .................................................. A47J 43/0777
See application file for complete search history.

(56) References Cited

U.S. PATENT DOCUMENTS

| | | | | |
|---|---|---|---|---|
| 2016/0309960 A1* | 10/2016 | Kolar | .................. | A47J 43/0761 |
| 2017/0095122 A1* | 4/2017 | Hoare | .................... | A23N 1/003 |
| 2018/0020875 A1* | 1/2018 | Kolar | .................. | A47J 43/0777 |
| | | | | 366/279 |

FOREIGN PATENT DOCUMENTS

| | | |
|---|---|---|
| CN | 207882459 U | 9/2018 |
| CN | 108652404 A | 10/2018 |
| KR | 100796634 B1 | 1/2008 |
| KR | 20170035852 A * | 3/2017 |
| WO | 2018087030 A1 | 5/2018 |

OTHER PUBLICATIONS

Espacenet translation of Nam, Hyeun Sik (KR20170035852A), published Mar. 31, 2017 (Year: 2017).*

* cited by examiner

*Primary Examiner* — Elizabeth Insler
(74) *Attorney, Agent, or Firm* — Bryan Cave Leighton Paisner LLP

(57) ABSTRACT

Proposed is a blender in which a main body operates when closure of a container lid of a container body is detected. In the blender, when the closure of the container lid of the container body is detected, power is transmitted from a first induction coil of the main body to a second induction coil of the container body, and when the change of the magnetic field of the first induction coil or the second induction coil generated by the power transmitted to the second induction coil is detected, the main body recognizes the closure of the container lid of the container body and operates.

19 Claims, 15 Drawing Sheets

BLENDER

CROSS-REFERENCE TO RELATED APPLICATIONS

This application is a National Stage filing under 35 U.S.C. 371 of International Application No. PCT/KR2020/010374, with an international filing date of Aug. 6, 2020, which claims the benefit of KR Patent Application No. 10-2019-0098859, filed on Aug. 13, 2019, all of which are incorporated by reference in their entirety herein.

TECHNICAL FIELD

The present disclosure relates generally to a blender. More particularly, the present disclosure relates to a blender in which a main body operates when the closure of a container lid of a container body is detected.

BACKGROUND ART

Generally, a blender is a household appliance which chops or crushes food received in a container body by blades rotated by an electric motor, and is also commonly referred to as a food mixer.

In such a blender, the container body is seated on the upper surface of a main body in which the motor is provided, and when the container body is seated, the blades provided in the container body are connected to a rotating shaft of the motor to be rotatable.

After a user puts food in the container body through an open portion of the container body and closes a container lid thereof, the user operates the motor by manipulating the main body to rotate the blades such that the food is crushed.

The container lid closes the open portion of the container body to protect food inside the container body. For safety during the operation of the blender, the blades are not rotated in a state in which the container lid does not close the container body. That is, to prevent accidents due to the blades, the blades are preferably allowed to be rotated only when the closure of the container lid of the container body is detected.

Conventionally, various methods of detecting the closure of a container lid have been proposed.

For example, in U.S. Pat. Nos. 6,910,800 and 7,871,196, a push rod physically connecting the container body with the blender body is provided, and when the container lid closes the container body, the container lid presses the push rod. A press detection part of the main body detects the pressing of the container lid, and detects the closure of the container lid.

However, the push rod and the press detection part are required to be separately installed, and the press detection part may be contaminated due to moisture or food that may enter the press detection part.

In addition, the push rod of the container body and the press detection part of the main body are required to be installed at positions corresponding to each other, so there is a problem that the container body is required to be mounted only in a specific direction.

Additionally, the push rod is required to be installed along the container body in a longitudinal direction thereof from the container body to the main body, so the design of the container body made of a transparent material is spoiled.

Recently, in order to solve this problem, a technique of detecting the closure of the container lid of the container body by the main body by using wireless communication or electromagnetic coupling between the container body and the main body has been disclosed.

For example, in European Patent No. EP2548485, when a container lid closes the container body, a blender detecting the closure of the container lid of the container body by the main body by using a wireless communication module is disclosed.

However, in such a prior art, the wireless communication module is required, and a separate power supply is required to be provided in the container body so as to drive the wireless communication module.

For another example, in US Patent Application Publication No. 2018/0020875, an interlocking blending device is disclosed in which a transmitting coil and a receiving coil are disposed in the main body, and a receiving coil and a transmitting coil are disposed in a container body so as to correspond to the transmitting coil and receiving coil, respectively, and when a container lid closes the container body, power is transmitted to the receiving coil of the container body through the transmitting coil of the main body, and in turn, the power is transmitted to the receiving coil of the main body through the transmitting coil of the container body, so that the main body detects the closure of the container lid of the container body.

However, in such a prior art, two coils, that is, a transmitting coil and a receiving coil, are required to be installed in each of the main body and the container body, and a device analyzing power received by the receiving coil of the main body is required.

In addition, two coils are arranged in each of the main body and the container body, and when electric current flows through each coil, induced currents change due to interference between magnetic fields induced in the coils. Accordingly, it is difficult to accurately analyze power received by the receiving coil of the main body.

Furthermore, power is transmitted from the transmitting coil of the main body to the receiving coil of the container body, and, due to the closure of a container lid of the container body, the power is transmitted from the transmitting coil of the container body to the receiving coil of the main body. In order to allow the receiving coil of the main body to receive effective power, high power is required to be transmitted from the transmitting coil of the main body to the receiving coil of the container body.

Additionally, to electrically connect a container lid detection circuit with the main body, a conductive member is installed along the transparent container body, and thus the design of the transparent container body is spoiled.

DISCLOSURE

Technical Problem

The present disclosure is intended to propose a blender in which one induction coil may be disposed in a main body and one induction coil may be disposed in a container body, and through one inductive coupling between the two induction coils, the closure of the container lid of the container body is detected.

The present disclosure is intended to propose a blender in which a detection error or contamination due to external contaminants such as water or food is prevented.

The present disclosure is intended to propose a blender in which the design of the container body made of a transparent material is maintained.

The present disclosure is intended to propose a blender in which the closure of a container lid of the container body is accurately detected with low power.

The present disclosure is intended to propose a blender in which induction coils mounted to the main body and the container body, respectively, are configured to be removable therefrom.

The present disclosure is intended to propose a blender in which when the container lid closes the container body, the main body may detect the closure of the container lid of the container body by detecting the change of a magnetic field generated by the induction coil disposed in the container body.

The objectives of the present disclosure are not limited to the objectives mentioned above, and other objectives not mentioned may be clearly understood by those skilled in the art to which the present disclosure belongs from the following description.

Technical Solution

In a blender of the present disclosure, through one-time inductive coupling between a first induction coil mounted to a main body and a second induction coil mounted to a container body, a magnetic sensor mounted to the main body may sense the change of the magnetic field of the second induction coil, so that the main body may detect the closure of the container lid of the container body.

In the blender of the present disclosure, according to the closure of the container lid of the container body, inductive coupling between the first induction coil and the second induction coil of the container body may be performed.

In the blender of the present disclosure, power may be generated in the second induction coil by inductive coupling between the first induction coil of the main body and the second induction coil of the container body, and the change of the magnetic field of the second induction coil may be caused by the generated power.

In the blender of the present disclosure, when the container lid of the container body is closed, a detection module disposed in the container body may detect the closure of the container lid, and when the closure of the container lid is detected by the detection module, inductive coupling between the first and second induction coils may be performed.

In the blender of the present disclosure, the detection module mounted to the upper part of the container body and the second induction coil mounted to the lower part of the container body may be electrically connected to each other through a conductive member made of a transparent material disposed from the upper part of the container body to the lower part thereof in the longitudinal direction of the container body.

In the blender of the present disclosure, a transparent electrode film (ITO) may be used as the conductive member, and the conductive member may be disposed in the longitudinal direction of the transparent container body from the upper part of the container body to the lower part thereof.

In the blender of the present disclosure, the first end of the transparent electrode film may be electrically connected to the detection module by a first connector which is detachable, and the second end of the transparent electrode film may be electrically connected to the second induction coil by a second connector which is detachable.

In the blender of the present disclosure, the first induction coil and the second induction coil may be disposed to be parallel to each other by facing each other such that the first induction coil and the second induction coil have the same center points such that inductive coupling between the first and second induction coils is effectively performed.

In the blender of the present disclosure, the first and second induction coils may be configured to be patterned on first and second PCB substrates, respectively, so as to be disposed to have an easy and simple configuration.

In the blender of the present disclosure, when the container body is mounted to the main body, the first and second PCB substrates may be installed to be disposed to be parallel to each other by facing each other, and the first and second induction coils patterned on the first and second PCB substrates, respectively, may be installed to have the same center points such that inductive coupling between the first and second induction coils is efficiently performed.

In the blender of the present disclosure, the first and second PCB substrates may be attached to and detached from the main body and the container body, respectively, so the induction coils may be easily and simply replaced.

In the blender of the present disclosure, when the magnetic sensor detects the change of a magnetic field, the main body may detect the closure of the container lid of the container body and may operate.

Advantageous Effects

The blender according to the present disclosure has the following effects.

First, in the blender of the present disclosure, the second induction coil may be disposed on the lower part of the container body, and the first induction coil may be disposed on the upper part of the main body, and thus according to the closure of the container lid, only inductive coupling between the first and second induction coils may be performed, thereby realizing simple control and operation and preventing interference of a magnetic field between the induction coils compared to a prior art.

Second, in the blender of the present disclosure, a module and a device configured to detect the closure of the container lid of the container body may be installed inside the container body and the main body, thereby preventing a detection error or contamination due to external contaminants such as water or food.

Third, in the blender of the present disclosure, for electrical connection between modules, the transparent electrode film (ITO) may be used to be disposed inside and outside of the container body, thereby maintaining the design of the transparent container body.

Fourth, in the blender of the present disclosure, the magnetic sensor may be used when detecting the closure of the container lid of the container body, thereby accurately detecting the closure of the container lid of the container body with low power.

Fifth, in the blender of the present disclosure, the first and second induction coils may be patterned on PCB substrates, respectively, thereby having an easy and simple configuration.

Sixth, in the blender of the present disclosure, the first and second induction coils mounted to the main body and the container body, respectively, may be attached thereto and detached therefrom, thereby enabling easy mounting and convenient replacement.

MODE FOR INVENTION

Figure 1:
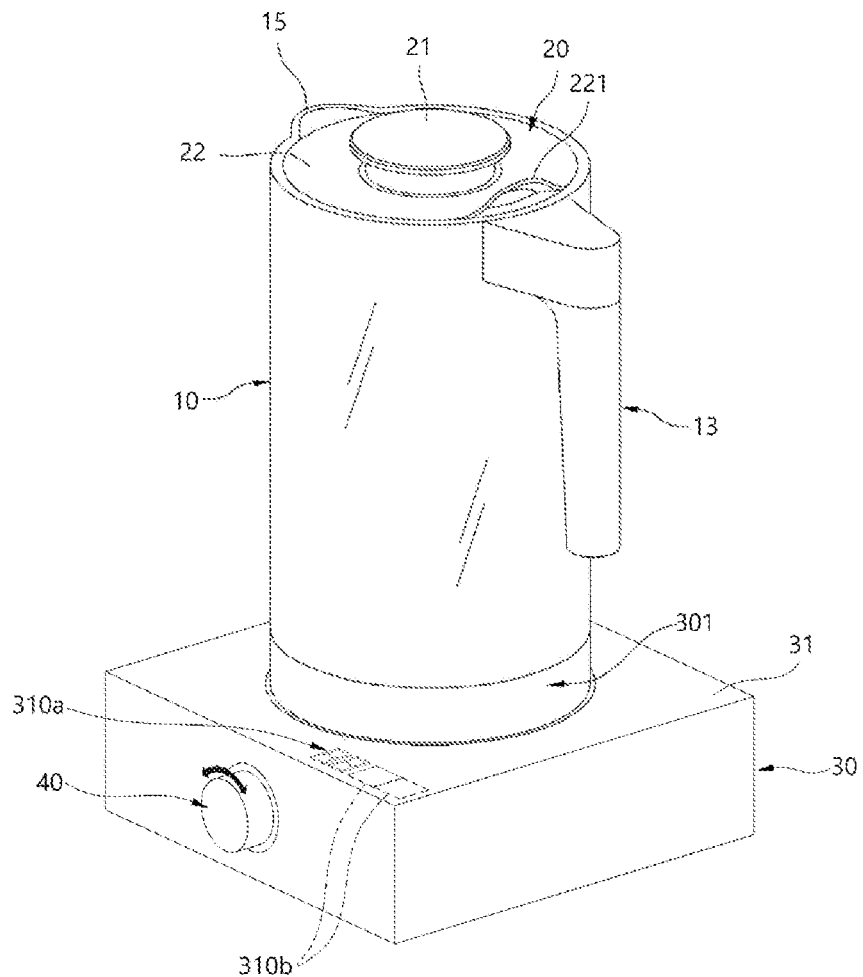
FIG. 1 is a perspective view of an exterior of a blender according to an embodiment of the present disclosure.

Advantages and features of the present disclosure and a method of achieving them will become apparent by referring to embodiments described below in detail in conjunction with the accompanying drawings. However, the present disclosure is not limited to the embodiments disclosed below and may be implemented in various different forms. The present embodiments are only provided to fully inform those of ordinary skill in the art to which the present disclosure belongs of the scope of the invention so that the disclosure of the present disclosure is complete. The present disclosure is defined by the scope of the claims. Like reference numerals refer to like elements throughout the specification.

Hereinafter, a blender of the present disclosure will be described in detail with reference to the accompanying drawings.

Figure 2:
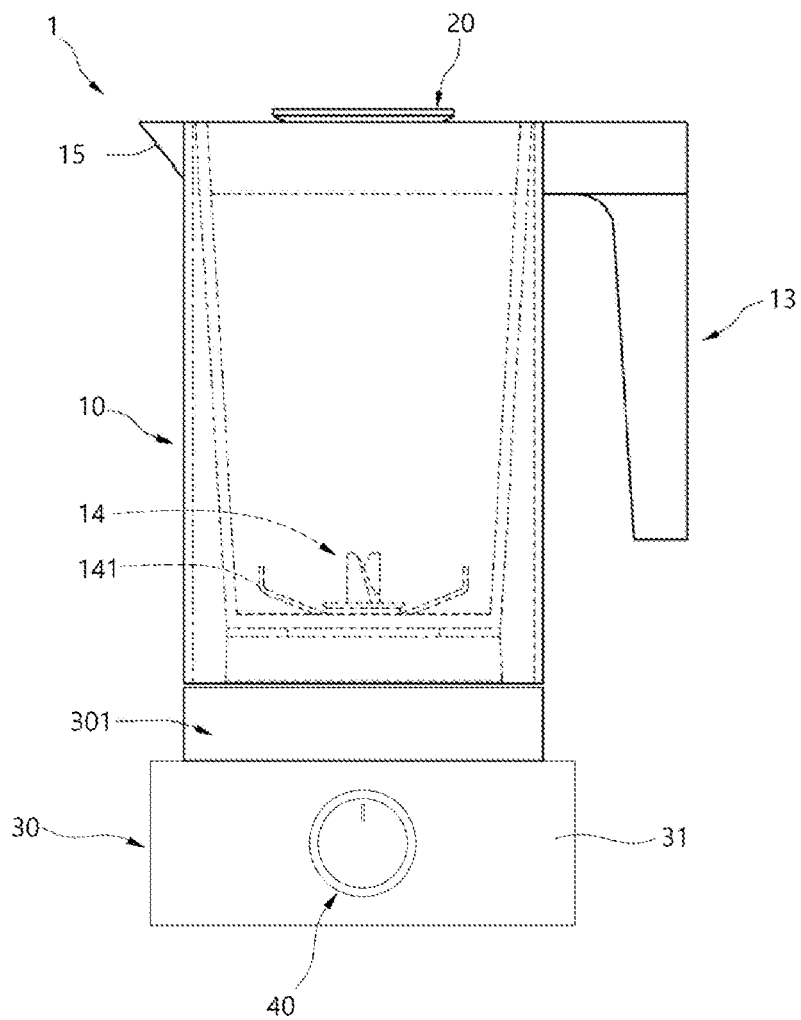
FIG. 2 is a front view of the blender.
Figure 3:
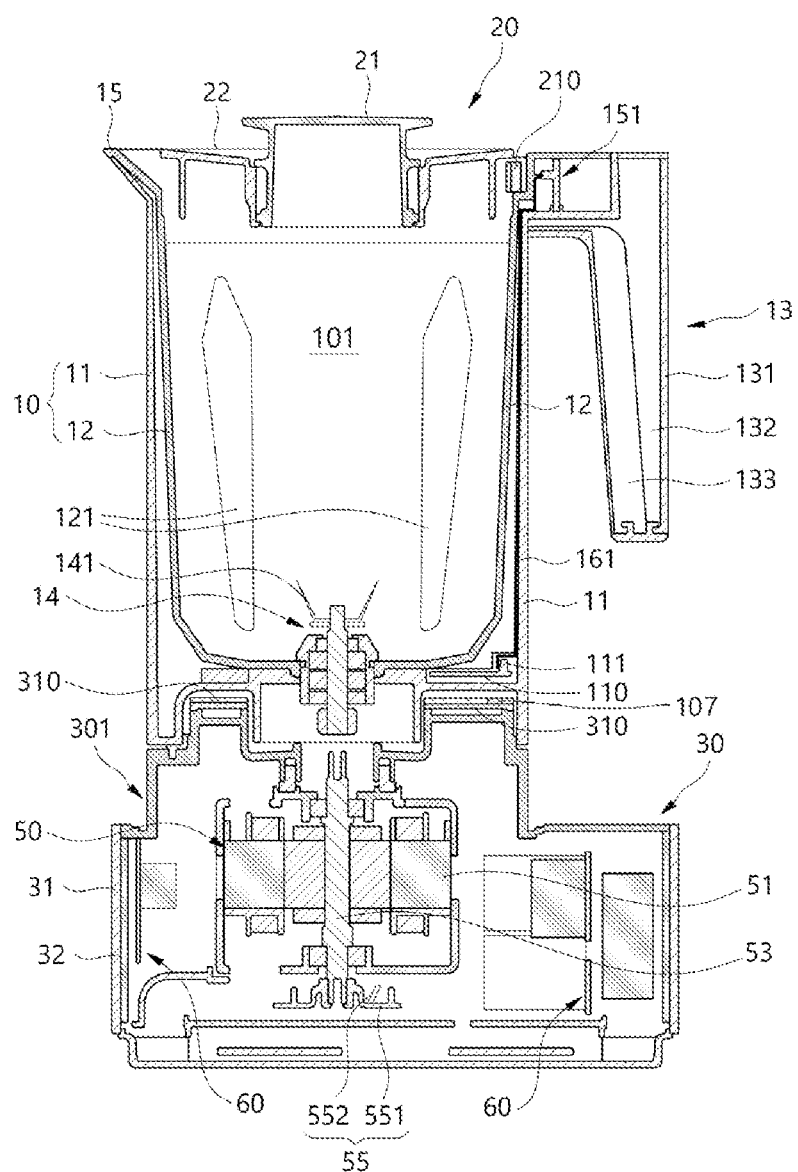
FIG. 3 is a vertical sectional view of the blender.

FIG. 1 is a perspective view of an exterior of a blender according to an embodiment of the present disclosure, FIG. 2 is a front view of the blender, and the blender, and FIG. 3 is a vertical sectional view of the blender.

Referring to the drawings, the blender 1 according to the embodiment of the present disclosure may include a main body 30 disposed on a foundation surface, and a container body 10 seated on the upper part of the main body 30.

A motor assembly 50 for operating the blender 1, electrical devices including a control PCB module 60, and components may be disposed inside the main body 30.

The main body 30 may be provided with a manipulation part 40 and 310b for manipulating the operation of the blender 1, and a display part 310a for displaying the operation thereof.

The main body 30 may be configured to have a hexahedral shape as a whole, and a seating part 301 may be provided on the upper surface of the main body 30 so as to seat the container body 10 on the seating part 301. The seating part 301 may be configured such that the container body 10 is attached to and detached from the seating part 301 in a vertical direction.

The exterior of the main body 30 may be constituted by an outer casing 31 which is made of metal or has a metal texture, and the outer casing 31 may be configured to have a hexahedral shape having an open lower surface.

An inner casing 32 may be formed in the outer casing 31, and space in which the motor assembly 50 and the control PCB module 60 are mounted may be defined inside the inner casing 32.

A knob 40 may be provided on the front surface of the main body 30 such that a user sets the operation of the blender 1. The knob 40 may protrude from the front surface of the main body 30 and may manipulate and set the operation of the blender 1 by being rotated.

The display part 310a may be provided on the upper surface of the main body 30 so as to display the operation state of the blender 1. The display part 310a may be configured as at least one seven-segment display.

A touch manipulation part 310b may be provided on the upper surface of the main body 30 such that the start or stop of the operation of the blender 1 can be manipulated. In order to manipulate the blender 1, the manipulation part 40 and 310b may include at least any one of the knob 40 and a touch module (not shown).

The seating part 301 may be formed on the upper surface of the main body 30. The seating part 301 may protrude from the upper surface of the main body 30, and a portion of the seating part 301 may be inserted into the lower surface of the container body 10 so as to stably support the container body 10.

When the container body 10 is seated on the seating part 301, the motor assembly 50 may be coupled to a blade module 14 provided in the container body 10 and may transmit a rotational force to the blade module 14.

The seating part 301 may have an appearance formed of the same material as the outer casing 31. The seating part 301 may be formed of a metal material or a material having a metal texture to have a sense of unity with the appearance of the main body 30 as a whole.

The motor assembly 50 may be mounted inside the main body 30 located under the seating part 301. The motor assembly 50 is intended to rotate the blade module 14 installed inside the container body 10, and may drive a motor in the motor assembly 50 to rotate the blade module 14 at high speed.

The motor assembly 50 may control the rotation speed of the motor according to the manipulation of the knob 40 such that the rotation speed of the blade module 14 can be controlled.

A first coil PCB module 310 may be disposed on a first side of the upper surface of the seating part 301. The first coil PCB module 310 may include a first PCB substrate on which a first induction coil is patterned by being wound multiple times. The first coil PCB module 310 may be connected to the control PCB module 60 and may receive power from the control PCB module 60.

The first PCB substrate may be attached to and detached from the main body 30. The attachment and detachment of the first PCB substrate may be enabled by the attachment and detachment of the first coil PCB module 310.

In addition, the first PCB substrate and the first induction coil may also be replaced by replacing the first coil PCB module 310.

A magnetic sensor 107 configured to sense a magnetic field may be installed on a second side of the upper surface of the seating part 301. The magnetic sensor 107 may sense a magnetic field generated in the surrounding area thereof and may transmit a sensing signal to the control PCB module 60.

The motor assembly 50 may include a motor therein. The upper end of the motor assembly 50 may be connected to the blade module 14 located in the container body 10. A cooling fan 55 may be provided on the lower end of the motor assembly 50.

The cooling fan 55 may be configured such that multiple fan blades 552 are radially disposed on the upper surface of a fan plate 551 having a shape of a plate, and during the operation of the motor assembly 50, may rotate simultaneously with the blade module 14 such that cold air introduced in the axial direction of the cooling fan 55 is radially discharged, so the flow of the cold air in the main body 30 may be effectively forced.

Multiple control PCB modules 60 may be disposed on the inner wall surface of the inner casing 32 constituting the inner side surface of the main body 30. The control PCB module 60 may include multiple control PCB modules, and the multiple control PCB modules may be disposed on the circumference of the inner side surface of the main body 30, that is, on the front, rear, left, and right surfaces thereof, respectively.

The control PCB module 60 may include multiple controllers (not shown) capable of controlling the operation of the main body 30 and the container body 10. These controllers may be provided by mounting a MYCOM (a microprocessor) to a PCB substrate in the form of an on-chip, and may include a program and software necessary for controlling the main body 30 and the container body 10.

The container body 10 may be configured as a cylindrical shape corresponding to the outer diameter of the seating part 301, and may have an open upper surface, so the container body may have space therein in which food is received.

The container body 10 may be formed of a transparent material such as glass or materials like glass through which the inner portion of the container body 10 can be seen.

The container body 10 may have the blade module 14 provided at the center of the inner lower surface thereof. The blade module 14 may include multiple blades 141 and may be connected to the motor assembly 50. Accordingly, when the motor assembly 50 operates in a state in which the container body 10 is seated on the main body 30, the blades 141 may rotate and grind or cut food contained inside the container body 10.

Multiple inner guides 121 may be provided in the container body 10 to guide food that is rotated. Each of the inner guides 121 may extend by a predetermined length upward from the lower end of the inner side surface of the container body 10.

Meanwhile, a second coil PCB module 110 may be disposed on a side of the lower end of the container body 10. The second coil PCB module 110 may include a second PCB substrate on which a second induction coil is patterned by being wound multiple times.

The second coil PCB module 110 may be disposed at a position vertically corresponding to the first coil PCB module 310. Particularly, the first induction coil and the second induction coil may be disposed at positions opposite to each other.

The second PCB substrate may be attached to and detached from the container body 10. The attachment and detachment of the second PCB substrate may be enabled by the attachment and detachment of the second coil PCB module 110.

In addition, the second PCB substrate and the second induction coil may also be replaced by replacing the second coil PCB module 110.

A spout 15 through which crushed food is poured may protrude from the upper end of the container body 10, and a handle 13 may be provided at a side facing the spout 15 by protruding therefrom.

The handle 13 may protrude from the upper end of the container body 10 to the outside and then may extend downward such that a user can lift or carry the container body 10. The protruding end portion of the handle 13 may be located on the same extension line as the side end of the main body 30.

A detection module 151 configured to detect the closure of a container lid 20 may be installed on the inner side of the container body 10 to which the handle 13 is coupled. The detection module 151 may be embodied as a PCB substrate, and may include a switch.

The detection module 151 may detect the closure of the container lid 20 in such a manner that the switch provided therein operates according to the closure of the container lid 20, and may determine whether to perform inductive coupling between the first and second coil PCB modules 310 and 110.

That is, when the detection module 151 detects the closure of the container lid 20 of the container body 10, current transmission between the first and second coil PCB modules 310 and 110 may be performed, but when the detection module 151 does not detect the closure of the container lid 20, current transmission between the first and second coil PCB modules 310 and 110 may not be performed.

The detection module 151 and the second coil PCB module 110 may be electrically connected to each other by a conductive member 161. The conductive member 161 may be electrically connected to the detection module 151 in a first end thereof, and may be electrically connected to the second coil PCB module 110 in a second end thereof by extending from the upper end of the container body 10 to the lower end thereof.

The detection module 151 and the second coil PCB module 110 may be provided with first and second connectors 152 and 111, respectively, for effective electrical connection to the conductive member 161. By using the first and second connectors 152 and 111, the detection module 151 and the second coil PCB module 110 may be easily attached to and detached from the conductive member 161. Accordingly, the detection module 151, the second coil PCB module 110, and the conductive member 161 may be more easily attached to and detached from the blender 1, and replacement thereof may also be easy.

The conductive member 161 may be in contact with the inner or outer surface of the container body 10. When being in contact with the outer surface, the conductive member 161 may be coated with a predetermined coating material to be fixedly attached to the outer surface.

The conductive member 161 may be formed of a transparent material such that the design of the container body 10 of the transparent material can be maintained.

The blender 1 according to the embodiment of the present disclosure may include the container lid 20.

The container lid 20 may shield the open upper surface of the container body 10, and a user may open the open upper surface of the container body 10 by separating the container lid 20 from the container body 10.

The open upper surface of the container body 10 may be closed (referred to as the closure of a container lid) or opened (referred to as the opening of the container lid) by the container lid 20 such that the open upper surface of the container body 10 may be closed and opened.

The container lid 20 may include a container lid handle 21.

A triggering member 210 turning on/off the switch of the detection module 151 may be arranged on the inner surface of a side of the container lid 20. When the triggering member 210 approaches the detection module 151 within a predetermined distance, the switch provided in the detection module 151 may be turned on. Contrarily, when the triggering member 210 moves away from the predetermined distance, the switch may be turned off.

Meanwhile, as described above, the blender 1 according to the embodiment of the present disclosure may be operated by the manipulation of the knob 40 and the touch manipulation part 310b, but may be configured to be selectively operated only under a specific condition.

For example, the blender 1 according to the embodiment may be operated only in the state in which the container lid 20 closes the container body 10, that is, in the state of the closure of the container lid. This is because when the blender 1 operates in the open state of the container lid, accidents may occur due to the blades 141, which are sharp, and food contained in the container body 10 may be ejected to the outside.

Figure 4:
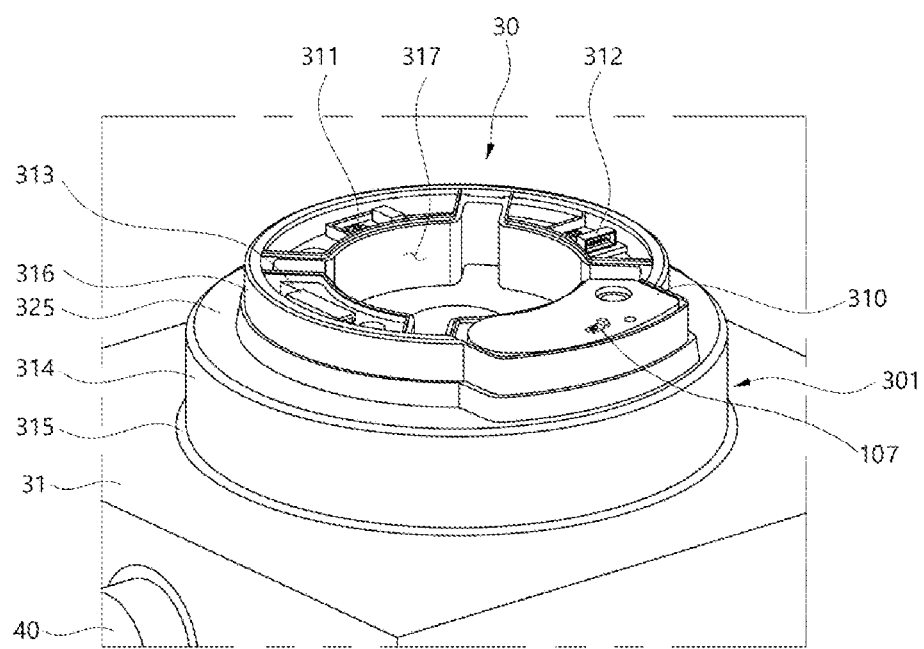
FIG. 4 is a perspective view of a main body which is a component of the blender according to the embodiment of the present disclosure.
Figure 5:
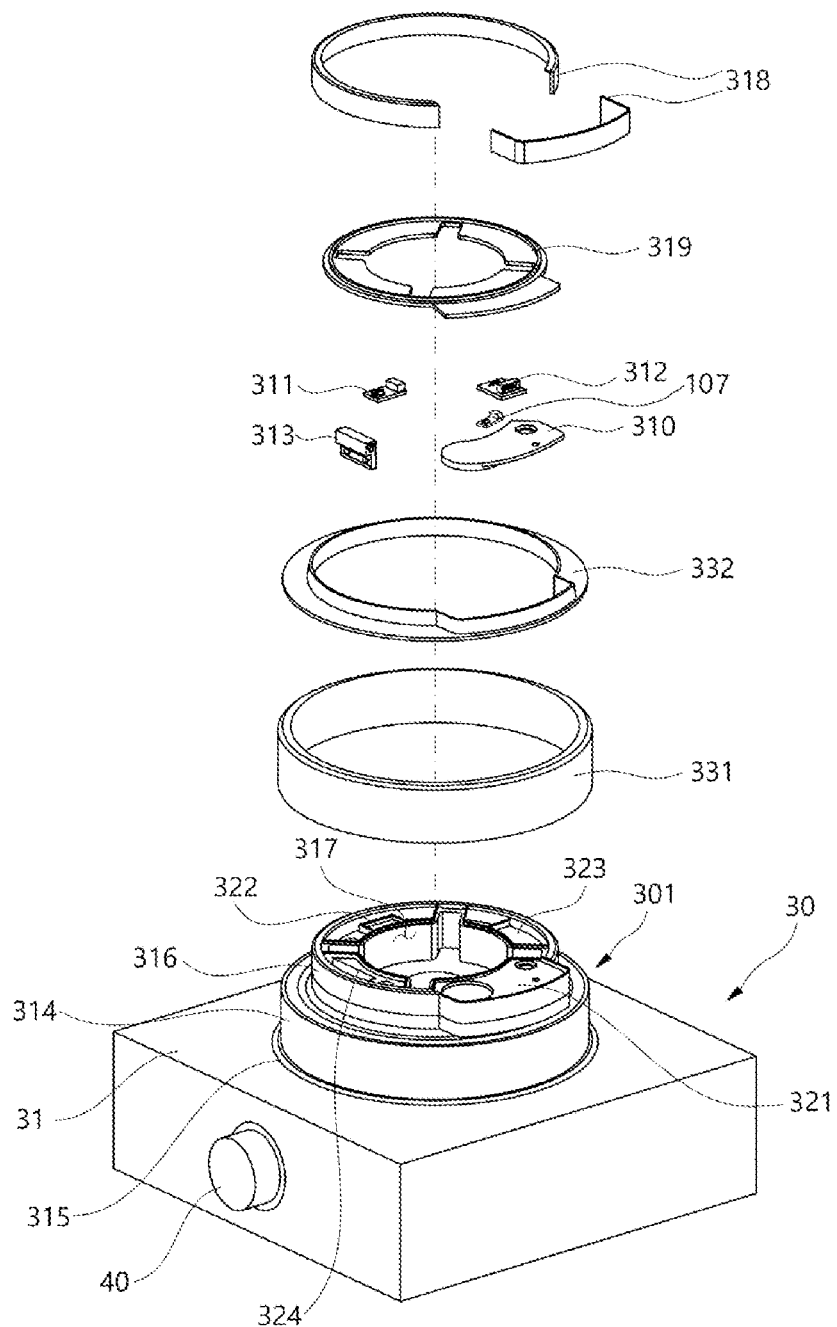
FIG. 5 is an exploded perspective view of the main body.

FIG. 4 is a perspective view of the main body which is a component of the blender according to the embodiment of the present disclosure, and FIG. 5 is an exploded perspective view of the main body.

Referring to the drawings, the main body 30 according to the embodiment of the present disclosure may be configured to have a cuboid shape, and may have a structure in which the seating part 301 protrudes on the upper surface of the main body 30 to seat the container body 10 thereon, and the knob 40 by which the operation of the blender 1 is controlled is disposed on the front surface of the main body 30.

As for the overall structure of the main body 30, the outer casing 31 may be mounted to the outer side of the main body 30 to constitute the exterior of the main body 30. The outer casing 31 may be formed of a metal material such as stainless steel and may be formed of materials having plate shapes, which are bent and joined to each other, thereby providing the shape of a very clean and rigid appearance.

The seating part 301 may have a two-step shape, and an entire appearance thereof may be constituted by a first seating part decoration 314, a second seating part decoration 316, and a lower decoration 315.

The first seating part decoration 314 and the second seating part decoration 316 may be formed of the same material as the outer casing 31 or of a material having the same texture as the outer casing 31.

The lower decoration 315 may be formed of a plastic or rubber material, and may be formed in a ring shape. In addition, during the mounting of the first seating part decoration 314, the lower part 315 may fill space between the first seating part decoration 314 and the outer casing 31 such that no gap is visible.

A first exterior material 331 may be mounted to the circumference of the side surface of the first seating part decoration 314. Such a first exterior material 331 may be formed of a stainless material and may protect the first seating part decoration 314.

The first seating part decoration 314 and the second seating part decoration 316 may have predetermined heights and may be formed in ring shapes as a whole when viewed from the top. The second seating part decoration 316 may have a smaller diameter than the first seating part decoration 314, and may be disposed at the center of the first seating part decoration 314.

A seating packing 332 may be disposed at the outskirt of the second seating part 316 arranged at the center of the upper surface 325 of the first seating part 314. The seating packing 332 is intended to give a sense of stability when the container body 10 is seated on the seating part 301, and may be formed of, for example, a rubber material or a silicone material.

The second seating part decoration 316 may have a circular shape as a whole when seen from the top and may be configured to have a portion protruding laterally.

An insertion space 317 may be defined in the center portion of the upper surface of the second seating part decoration 316, and a first seating groove 321 and a second seating groove 322 may be formed on the circumference of the upper surface of the second seating part decoration 316. A third seating groove 323 and a fourth seating groove 324 may be selectively formed on the upper surface of the second seating part decoration 316.

The first coil PCB module 310 may be seated in the first seating groove 321. A photosensor 311 may be seated in the second seating groove 322. A Hall sensor 312 may be selectively seated in the third seating groove 323 so as to detect the type of the container body 10 seated on the main body 30, and a reed switch 313 may be seated in the fourth seating groove 324 so as to detect whether the container body 10 is seated.

The first coil PCB module 310, the photosensor 311, the Hall sensor 312, and the reed switch 313 may be attached to and detached from the first, second, third, and fourth seating grooves 321, 322, 323, and 324, respectively.

When the container body 10 is seated on the main body 30, the Hall sensor 312 may detect a magnet (not shown) attached to the lower part of the container body 10 according to the type of the container body 10 and may detect the type of the container body 10. The magnitude of the magnetic force of a magnet may be different for each type of the container body 10, and accordingly, the type of the container body 10 may be detected by using the magnitude of a magnetic force detected by the Hall sensor 312.

When the container body 10 is seated on the main body 30, the reed switch 313 may detect a magnet (not shown) mounted to the lower part of the container body 10 and may detect whether the container body 10 is seated. When the magnet approaches the reed switch 313, the reed switch 313 may be turned on to detect the approaching of the magnet, and through the detection of the approaching of the magnet, the seating of the container body 10 may be detected.

While the first coil PCB module 310, the photosensor 311, the Hall sensor 312, and the reed switch 313 are seated, a cover 114 may be coupled to the upper part of the second seating part decoration 316.

The cover 114 may hold and protect the first coil PCB module 310, the photosensor 311, the Hall sensor 312, and the reed switch 313, and may be formed of a material having a magnetic field penetration function such that the magnetic sensor 107 can sense a magnetic field through the cover 114.

While the cover 114 is coupled to the second seating part decoration 316, a second exterior material 318 may be mounted to the circumference of each of the side surfaces of the cover 114 and the second seating part decoration 316.

Figure 6:
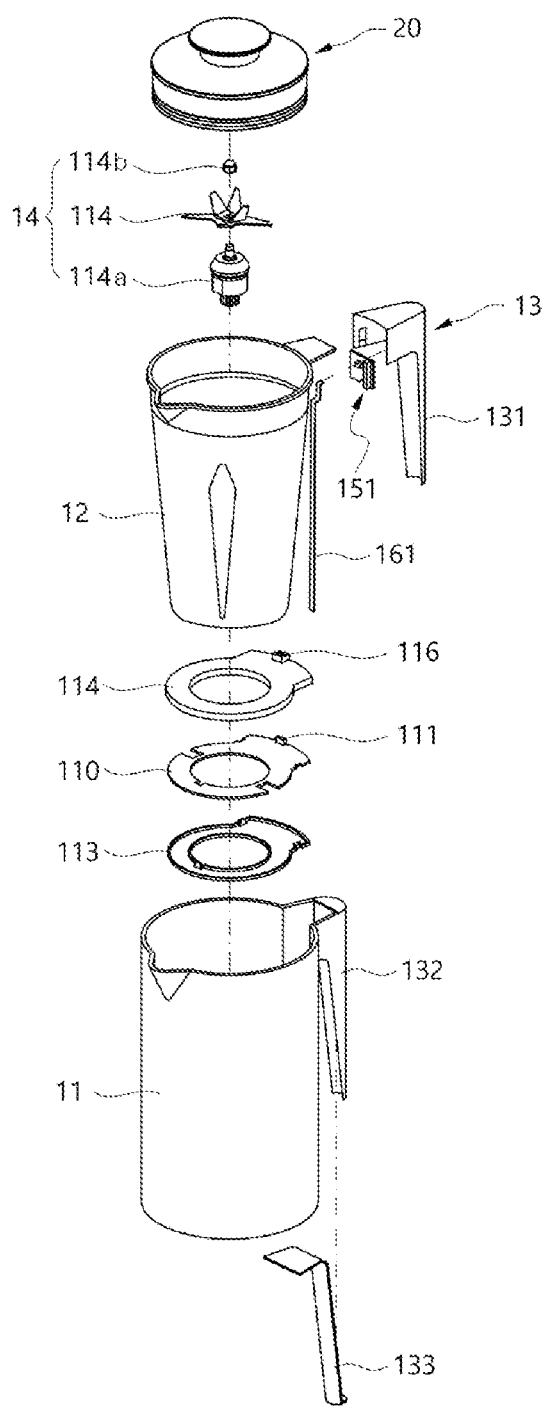
FIG. 6 is an exploded perspective view of a container body which is a component of the blender according to the present disclosure.
Figure 7:
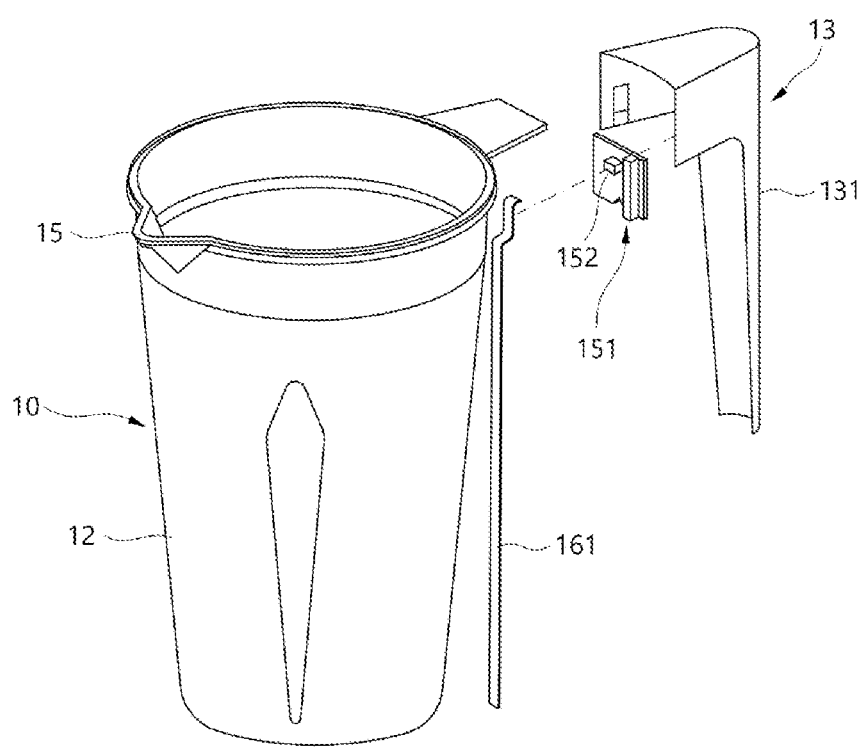
FIG. 7 is a perspective view of an inner container body of the container body according to the present disclosure seen at a different angle.
Figure 8:
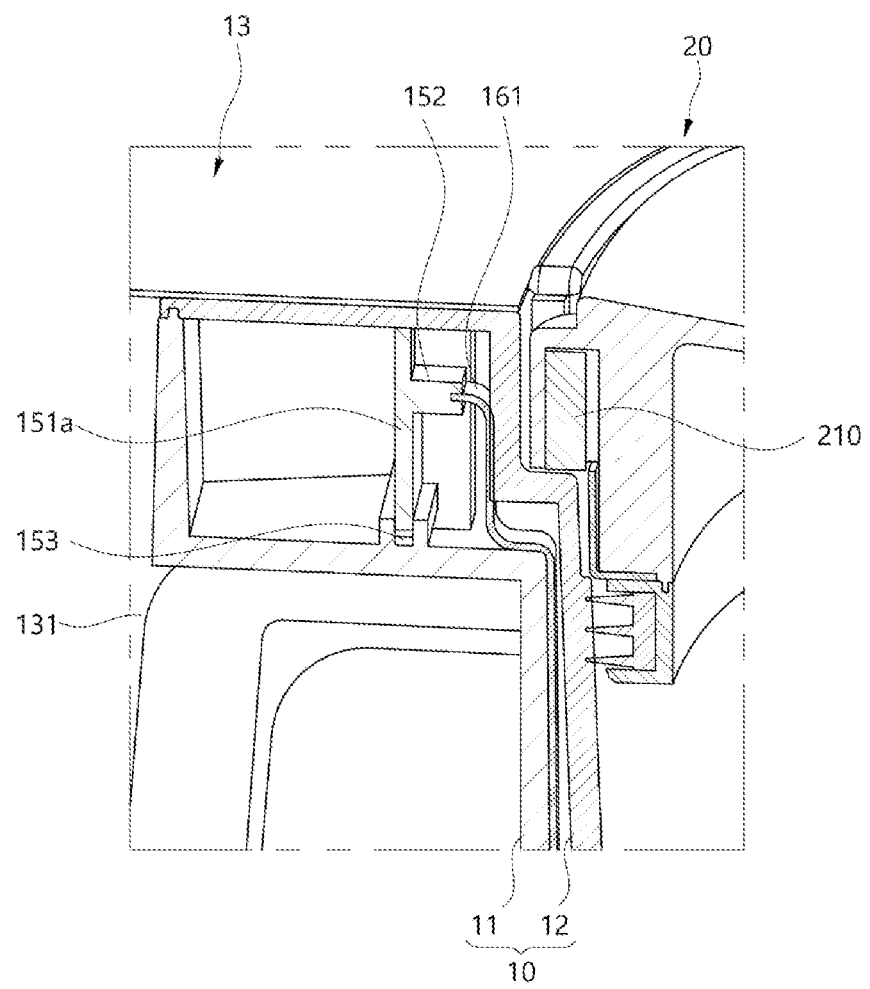
FIG. 8 is a detailed view of a detection module of the container body.
Figure 9:
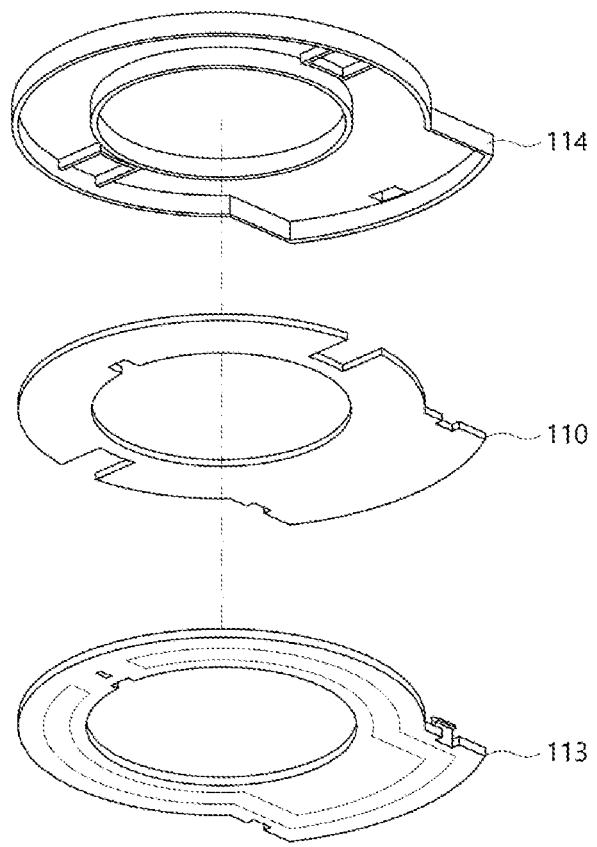
FIG. 9 is an exploded perspective view of a second coil PCB module of the container body seen from a lower side thereof.

FIG. 6 is an exploded perspective view of the container body which is a component of the blender according to the embodiment of the present disclosure, FIG. 7 is a perspective view illustrating the coupled structure of an inner container body and a handle cover seen at a different angle, FIG. 8 is a detailed view of the detection module of the container body, and FIG. 9 is an exploded perspective view of the second coil PCB module of the container body seen from a lower side thereof.

Referring to the drawings, the container body 10 according to the embodiment may be configured in a cylindrical shape having the open upper surface. The blade module 14 may be mounted to the lower surface of the container body 10, and the container lid 20 may be detachably mounted to the open upper surface of the container body 10.

The container body 10 may be formed of a material such as glass, Tritan, or transparent plastic, etc. to check the state of food therein during the operation of the blender 1.

The container body 10 may include an outer container body 11 constituting an outer shape thereof, and the inner container body 12 having inner space in which food is received.

The inner container body 12 and the outer container body 11 may be coupled to each other and may constitute the overall shape of the container body 10 such that the container body 10 has a double wall structure.

The inner container body 12 may be spaced apart from the outer container body 11, which may define space between the outer container body 11 and the inner container body 12. The inner container body 12 may have a diameter decreasing gradually downward. The lower part of the inner container body 12 may be configured to be inclined or round toward the blade module 14 such that food in the container body 10 may be directed to the blade module 14.

The outer container body 11 may have a cylindrical shape having upper and lower ends which have the same outer diameters, respectively, such that the appearance of the container body 10 looks neat.

The outer diameter of the outer container body 11 may be configured to be the same as the outer diameter of the seating part 301, and while the container body 10 is mounted to the main body 30, the main body 30 and the container body 10 may be seen as being integrated with each other.

A receiving part (not shown) of the main body may be formed on the lower surface of the outer container body 11. The receiving part 102 of the main body may have space recessed upward from the lower surface of the outer container body 11 such that the second seating part decoration 316 described above can be inserted into the space. Due to the coupling of the receiving part 102 of the main body to the second seating part decoration 316, the state of the container body 10 mounted to the seating part 301 may be maintained.

A middle handle 132 may be formed at a side of the upper end of the outer container body 11 by protruding therefrom. When the middle handle 132 is formed by protruding, an inner space may be defined at the side of the upper end of the outer container body 11 to receive the detection module 151.

An outer handle 131 may be coupled to the outer side of the middle handle 132, and an inner handle 133 may be coupled to the inner side of the middle handle 132 so as to constitute the handle 13 as a whole.

The upper end of the inner container body 12 may be configured to have an inclined surface 122 having an inner diameter decreasing gradually downward. Accordingly, in a process in which the container lid 20 is inserted to the open upper surface of the container body 10, the container lid 20 may be configured to seal the inner container body 12 while being gradually brought into close contact with the inner container body 12.

The upper inclined surface of the inner container body 12 may be configured from the upper end of the container body 10 to the upper end of the inner guide 121, and may be configured along the circumference of the inner surface of the container body 10.

The inner guide 121 may be formed on the inner side surface of the inner container body 12. The inner guide 121 may extend from the inclined surface 122 to the bottom surface of the inner container body 12.

The blade module 14 may be disposed at the inner lower part of the inner container body 12, and may be configured such that multiple blades 141 are inserted into the upper part of a base 141a and may be fastened thereto by a nut 141b from the upper side.

The second coil PCB module 110 may be disposed on the lower part of the inner container body 12. As described above, the second coil PCB module 110 may be embodied with the second induction coil 201 patterned on the same plane as the second PCB substrate. The second induction coil 201 may be wound multiple times on the PCB substrate in a spiral shape relative to a center point 201a.

The second coil PCB module 110 may be fixedly mounted to a lower plate 113, and while the second coil PCB module 110 is fixedly mounted to the lower plate 113, the cover 114 may be coupled to the lower plate 113.

In addition, the second connector 111 may be installed at a side of the upper surface of the second coil PCB module 110 by protruding therefrom to electrically connect the second induction coil 201 with the conductive member 161.

A receiving part 116 having an open upper surface may be installed on the upper surface of the cover 114 by protruding therefrom to receive the second connector 111 provided under the cover 114, and the conductive member 161 may be coupled to the second connector 111 exposed through the receiving part 116 to be electrically connected to the second coil PCB module 110.

The detection module 151 may be installed on the inner side of the upper end portion of the container body 10 to which the handle 13 is coupled. The detection module 151 may be embodied as a PCB and may include a switch which can be turned on/off as described later. Such a switch may be switched on only under a specific condition.

The detection module 151 may detect whether the container lid 20 closes the container body 10. Specifically, when the container lid 20 closes the container body 10, the switch located inside the detection module 151 may be turned on by the triggering member 210 installed inside the container lid 2.

Accordingly, in the embodiment, when the switch in the detection module 151 is turned on, the detection module 151 may detect the closure of the container lid 20.

The detection module 151 may be seated in a groove 153 formed thereunder and may maintain stability thereof. The first connector 152 may be mounted to the detection module 151 such that the detection module 151 is electrically connected with the conductive member 161.

The conductive member 161 may be disposed between the outer container body 11 and the inner container body 12. The conductive member 161 may be disposed by extending in the longitudinal direction of the container body 10 from the upper part of the container body 10 to the lower part thereof.

The conductive member 161 may be formed of a transparent material to secure and maintain the transparency of the outer container body 11 and the inner container body 12 formed of a material such as glass, Tritan, or transparent plastic, etc. In the embodiment, the conductive member 161 may include a transparent electrode film (ITO).

The first end of the conductive member 161 may be electrically connected to the detection module 151 by the first connector 152, and the second end of the conductive member 161 may be electrically connected to the second coil PCB module 110 by the second connector 111. Specifically, the first end of the conductive member 161 may be connected to the switch provided in the detection module 151, and the second end of the conductive member 161 may be connected to the second induction coil 201 provided in the second coil PCB module 110.

The conductive member 161 may be in contact with the inner surface of the outer container body 11 or with the outer surface of the inner container body 12 and may extend from the upper part of the container body to the lower part thereof.

The upper end part of the conductive member 161 may be installed by bending in a section according to the shapes of the outer container body 11 and the inner container body 12.

The triggering member 210 may be mounted to the inside of a side surface of the container lid 20 such that the triggering member 210 is located at a position corresponding to the detection module 151. When the container lid 20 closes the container body 10, the triggering member 210 may be installed to approach the detection module 151 within a predetermined distance.

When the triggering member 210 approaches the detection module 151 within a predetermined distance, the switch of the detection module 151 may be turned on.

Specifically, when the container lid 20 closes the container body 10, the triggering member 210 installed inside the container lid 20 may approach the detection module 151 within a predetermined distance, and the switch of the detection module 151 may be turned on. When the container lid 20 is opened, the triggering member 210 of the container lid 20 may move away by a predetermined distance from the detection module 151 and the switch of the detection module 151 may be turned off.

Figure 10:
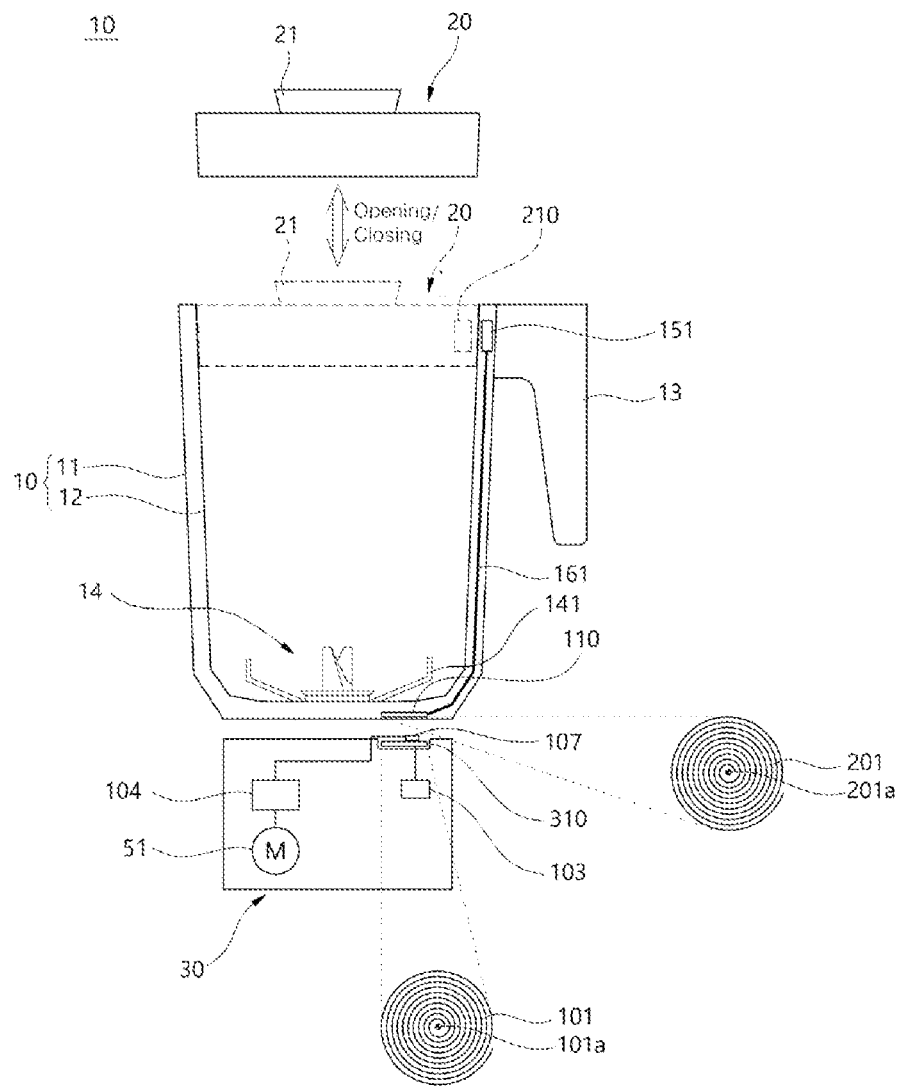
FIG. 10 is a partial cross sectional view schematically illustrating the configuration of a portion of the blender according to the embodiment of the present disclosure.
Figure 11:
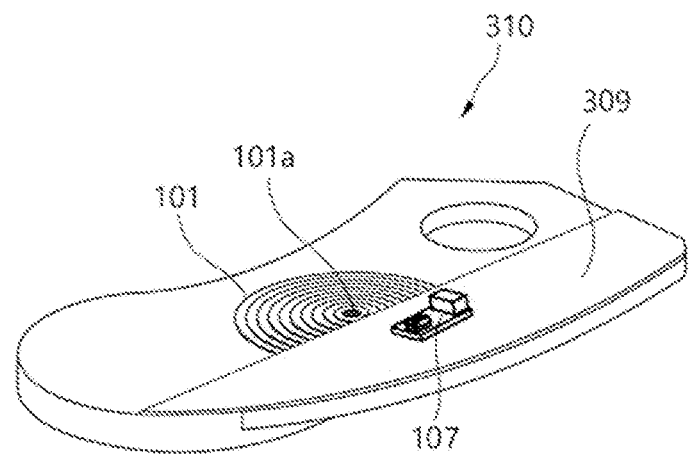
FIG. 11 is a detailed view of the upper surface of a first coil PCB module of the main body.
Figure 12:
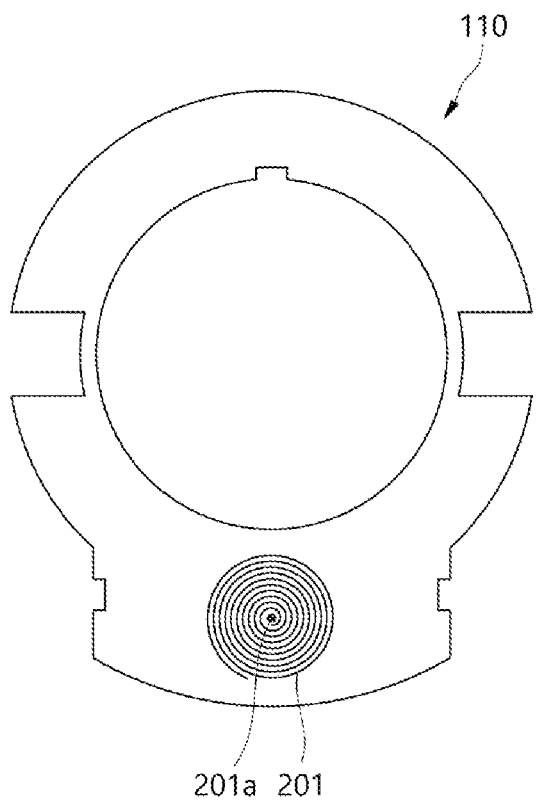
FIG. 12 is a detailed view of the lower surface of the second coil PCB module of the container body.
Figure 13:
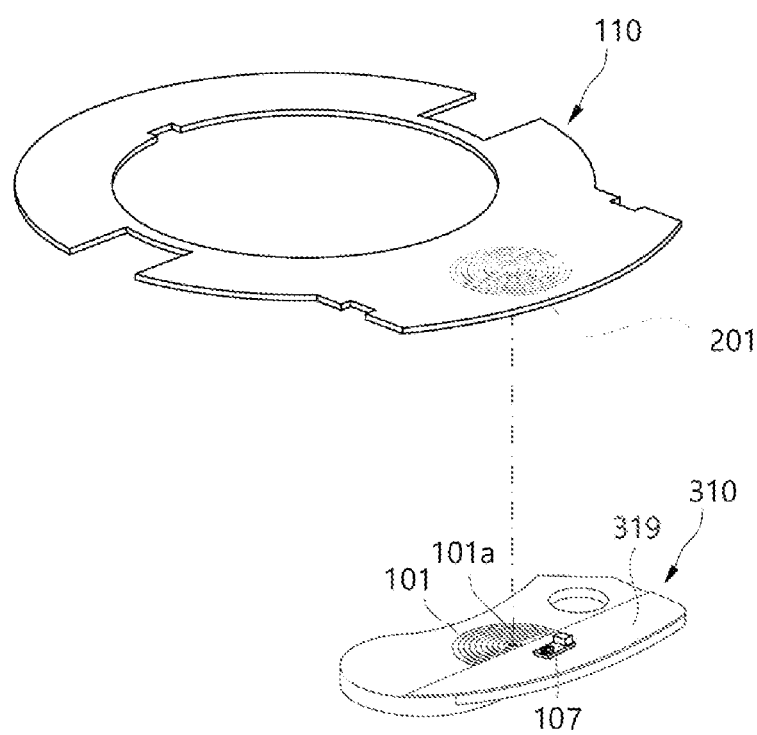
FIG. 13 is a view illustrating arrangement between the first and second coil PCB modules.

FIG. 10 is a partial cross sectional view schematically illustrating the configuration of a portion of the blender according to the embodiment of the present disclosure, FIG. 11 is a detailed view of the upper surface of the first coil PCB module of the main body, FIG. 12 is a detailed view of the lower surface of the second coil PCB module of the container body, and FIG. 13 is a view schematically illustrating arrangement between the first and second coil PCB modules.

Referring to the drawings, the first coil PCB module 310 may be installed at a first side of the upper part of the main body 30 of the blender 1 according to the embodiment of the present disclosure.

The first coil PCB module 310 may be embodied with the first induction coil 101 patterned on a PCB substrate. The first induction coil 101 may be wound multiple times on the PCB substrate in a spiral shape relative to a center point 101a.

The main body 30 may include a power supply part 103 therein. The power supply part 103 may apply current to the first induction coil 101. When the current is applied to the first induction coil 101, a magnetic field may be generated in the first induction coil 101.

The power supply part 103 may be mounted to the first coil PCB module 310, or to the control PCB module 60.

The power supply part 103 may change the intensity of the current applied to the first induction coil 101, and the magnetic field of the first induction coil 101 may be changed by the change of the intensity of the current.

The main body 30 may include the magnetic sensor 107 provided on a second side of the upper part thereof so as to sense a magnetic field generated in the surrounding area of the main body. Although the magnetic sensor 107 may be mounted to the upper surface of the first coil PCB module 310, the position of the magnetic sensor 107 is not limited thereto.

When the magnetic sensor 107 is disposed on the upper surface of the first coil PCB module 310, the magnetic sensor 107 may be disposed at an appropriate position such that the magnetic sensor 107 is not in contact with the first induction coil 101. Meanwhile, as illustrated in FIG. 11, after a protection member 309 is disposed on the upper surface of the first induction coil 101, the magnetic sensor 107 may be installed on the protection member.

The magnetic sensor 107 may sense a magnetic field generated in the first induction coil 101 and/or the second induction coil 201 and thus may be installed to be close to the first and second induction coils 101 and 201. Accordingly, the magnetic sensor 107 may be disposed above the first induction coil 101, and in this case, the protection member 309 may be disposed between the first induction coil 101 and the magnetic sensor 107 such that the first induction coil 101 can be protected.

Meanwhile, after forming a protective film on the upper surface of the first induction coil 101, the magnetic sensor 107 may be disposed on the upper surface of the protective film.

The main body 30 may include a controller 104 therein. The controller 104 may be connected to the motor assembly 50 described above.

The controller 104 may check whether there is a change in the intensity of a magnetic field sensed by the magnetic sensor 107. When there is a change in the intensity of the magnetic field, the controller 104 may drive the motor 51 of the motor assembly 50. The controller 104 may be mounted to the control PCB module 60 described above.

The second coil PCB module 110 may be installed on a side of the lower surface of the container body 10.

The second coil PCB module 110 may be embodied with the second induction coil 201 patterned on the second PCB substrate. The second induction coil 201 may be wound multiple times on the PCB substrate in a spiral shape relative to the center point 201a.

Like the embodiment illustrated in the drawing, when the container body 10 is seated on the main body 30, the first induction coil 101 of the main body 30 and the second induction coil 201 of the container body 10 may be disposed at a predetermined interval at positions corresponding to each other.

Specifically, when the container body 10 is seated on the main body 30, the first induction coil 101 and the second induction coil 201 may be concentric in the two center points 101a and 201a, respectively, and may be disposed to be parallel to each other by facing each other.

Inductive coupling between the first induction coil 101 and the second induction coil 201 may be selectively performed under specific condition.

When the intensity of current applied to the first induction coil 101 changes, the magnetic field of the first induction coil 101 may be changed, and due to inductive coupling between the first induction coil 101 and the second induction coil 201, a magnetic flux passing through the second induction coil 201 may be changed, so an induced electromotive force may be generated in the second induction coil 201.

The positions and arrangement of the first and second induction coils 101 and 201 may be determined such that inductive coupling is appropriately performed therebetween.

The detection module 151 may be mounted to the upper end part of the container body 10. In the embodiment, in the upper end part the container body 10, the detection module 151 may be mounted between the outer container body 11 and the inner container body 12. The detection module 151 may be embodied with the switch 151a to be described later mounted to a PCB substrate.

The triggering member 210 may be mounted on a side of the side surface of the container lid 20. When the container lid 20 closes the container body 10, the triggering member 210 may be disposed to approach the detection module 151 located substantially at the same height as the triggering member 210 within a predetermined distance.

When the container lid 20 closes the container body 10, the triggering member 210 of the container lid 20 may approach the detection module 151 within a predetermined distance, and the switch 151a of the detection module 151 may be turned on. Accordingly, the detection module 151 may function to detect the closure of the container lid.

In the embodiment, the triggering member 210 may be a magnetic body, and the switch 151a may be a reed switch.

In the embodiment, the reed switch may be turned off in an initial stage, and when the magnetic body approaches the reed switch within a predetermined distance, the reed switch may be turned on.

The detection module 151 and the second coil PCB module 110 may be electrically connected to each other through the transparent conductive member 161. Specifically, the transparent conductive member 161 may electrically connect the switch 151a of the detection module 151 with the second induction coil 201 of the second coil PCB module 110.

In the embodiment, the conductive member 161 may include a transparent electrode film (ITO). The transparent electrode film (ITO) may be a transparent material capable of conducting current.

The transparent electrode film (ITO) may be installed at various positions. According to the embodiment, the transparent electrode film may be installed between the outer container body 11 and the inner container body 12. The transparent electrode film may be preferably attached to the inner surface of the outer container body 11 or on the outer surface of the inner container body 12.

For another example, the transparent electrode film (ITO) may be attached to the outer surface of the outer container body 11, and in this case, the transparent electrode film (ITO) may be coated with a transparent coating material such that the transparent electrode film is protected from the outside.

The transparent electrode film (ITO) may be disposed in the longitudinal direction of the container body 10 from the detection module 151 of the upper part of the container body 10 to the second coil PCB module 110 of the lower part of the container body 10. Accordingly, due to the application of such a transparent electrode film (ITO), the transparency of the container body 10 may be maintained.

Meanwhile, the second induction coil 201 and the switch 151a may be electrically connected in series to each other. Accordingly, according to the turning on/off of the switch 151a, current may be supplied and interrupted by power induced in the second induction coil 201.

Figure 14:
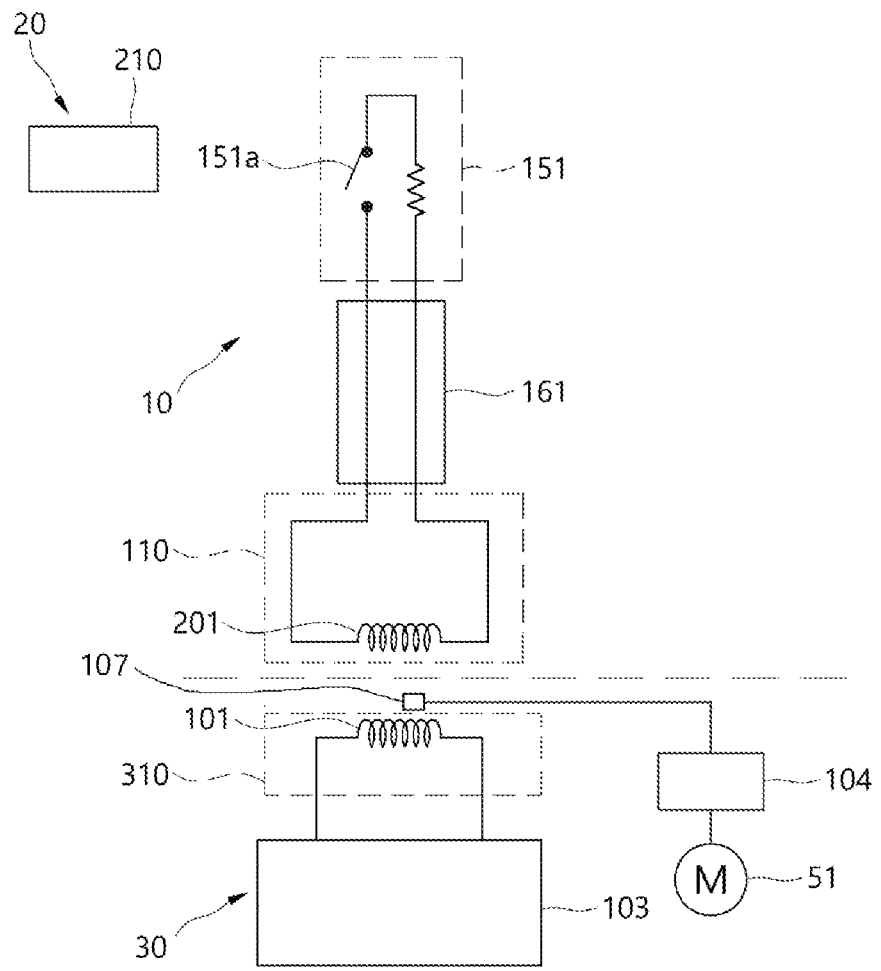
FIG. 14 is an equivalent circuit diagram of the blender of FIG. 10.

FIG. 14 is a view illustrating an example of an equivalent circuit diagram of the blender of FIG. 10.

Referring to the drawing, in the main body 30, the first induction coil 101 may be connected to the power supply part 103, and the magnetic sensor 107 may be connected to the controller 104. The controller 104 may control the motor 51 of the motor assembly 50.

The power supply part 103 may supply current to the first induction coil 101, and a magnetic field may be generated in the first induction coil 101 by the supplied current.

The power supply part 103 may control the intensity of current supplied to the first induction coil 101 such that the change of the magnetic field of the first induction coil 101 is induced.

In the container body 10, the second induction coil 201 may be connected to the detection module 151.

In this case, in the embodiment, for electrical connection between the second induction coil 201 and the detection module 151, the conductive member 161 made of a transparent material may be used. In the embodiment, the conductive member 161 may include a transparent electrode film (ITO).

The detection module 151 may include the switch 151a. In the embodiment, the switch 151a may include the reed switch.

The operation of such an equivalent circuit diagram will be described.

In a state in which the container lid 20 does not close the container body 10, the detection module 151 may not detect the triggering member 210, so the turn-off state of the switch 151a may be maintained.

In a state in which the switch 151a is turned off, the second induction coil 201 and the switch 151a may not form a closed circuit, so inductive coupling between the first induction coil 101 and the second induction coil 201 may not occur.

Accordingly, even when the power supply part 103 applies current to the first induction coil 101 in a state in which the switch 151a is turned off, an induced electromotive force may not be generated in the second induction coil 201.

Meanwhile, as described above, even when the switch 151a is turned off, the power supply part 103 may or may not apply current to the first induction coil 101.

When the power supply part 103 applies current to the first induction coil 101 in a state in which the switch 151a is turned off, a magnetic field may be generated in the first induction coil 101. In this case, the magnetic sensor 107 may sense the magnetic field generated in the first induction coil 101. The magnetic sensor 107 may transmit a magnetic field sensing signal to the controller 104.

In addition, when the power supply part 103 does not apply current to the first induction coil 101, a magnetic field may not be generated in the first induction coil 101, so the magnetic sensor 107 may not sense a magnetic field.

When the container lid 20 closes the container body 10, the triggering member 210 may approach the detection module 151 within a predetermined distance, and the switch 151a of the detection module 151 may be turned on by the triggering member 210.

When the switch 151a is turned on, the second induction coil 201 and the switch 151a connected in series to each other may form a closed circuit.

As described above, when the closed circuit is formed, inductive coupling between the first induction coil 101 and the second induction coil 201 may be performed, and an induced electromotive force may be generated in the second induction coil 201.

When the induced electromotive force is generated in the second induction coil 201, a magnetic field may be generated in the second induction coil 201. Accordingly, the magnetic sensor 107 may sense the magnetic field generated in the second induction coil 201. A magnetic field sensing signal may be transmitted from the magnetic sensor 107 to the controller 104.

As described above, in some cases, the magnetic sensor 107 may sense a magnetic field generated in the first induction coil 101 and/or the second induction coil 201. That is, there may be a case in which the magnetic sensor 107 senses only the magnetic field of the second induction coil 201, and there may be a case in which the magnetic sensor 107 senses the magnetic fields of the first induction coil 101 and the second induction coil 201.

The magnetic sensor 107 may sense the magnetic field of the first induction coil 101 and/or the second induction coil 201, and may transmit the magnetic field sensing signal to the controller 104, and the controller 104 may check the change of the sensed magnetic field, that is, the change of the intensity of the magnetic field by using the sensing signal and then may drive the motor 51.

Accordingly, in the embodiment, in a state in which the container lid is opened, the magnetic sensor 107 may not sense a magnetic field or may sense only the magnetic field of the first induction coil 101, so the controller 104 may not drive the motor 51. Only when the container lid is closed, may the magnetic sensor 107 sense a magnetic field or the change of a magnetic field may be generated, so the controller 104 may drive the motor 51.

Accordingly, the blender 1 may operate only under the specific condition of the closure of the container lid.

Figure 15:
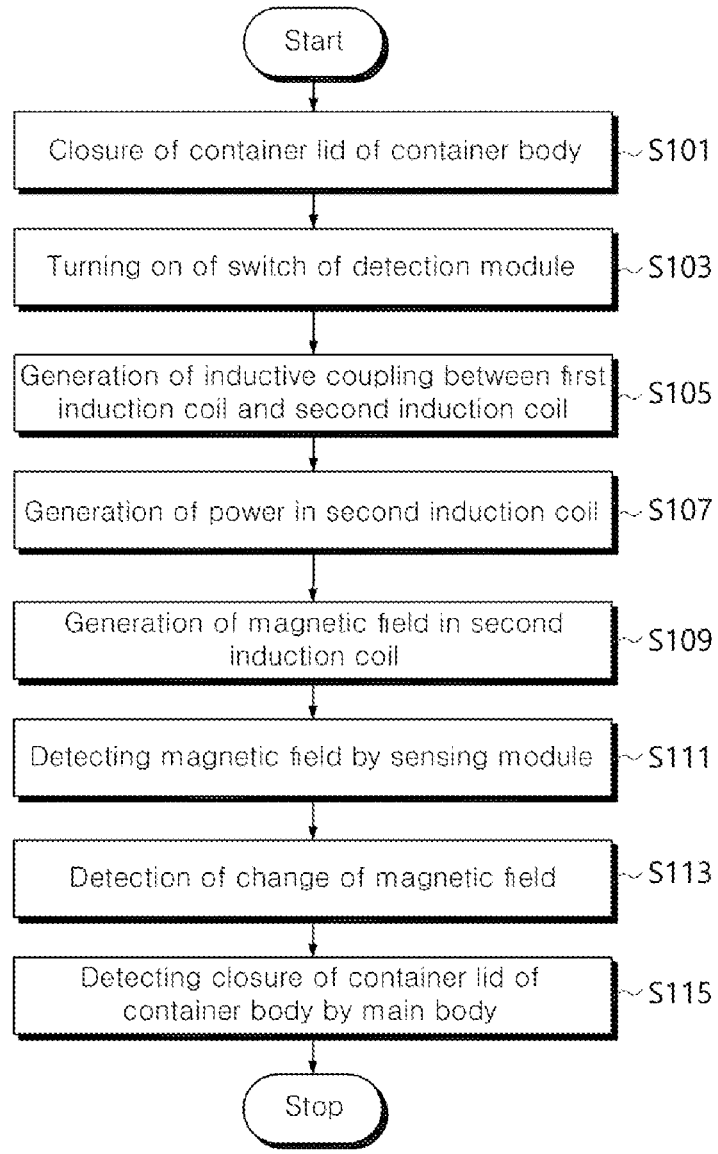
FIG. 15 is a flowchart illustrating a process of detecting the closure of a container lid in the main body according to the embodiment of the present disclosure.

FIG. 15 is a flowchart illustrating the process of detecting the closure of the container lid in the main body according to the embodiment of the present disclosure.

Referring to FIG. 15, when a manipulation of a user is input through the manipulation part 40 and 310b in a state in which the container body 10 is seated on the main body 30, the blender 1 according to the present disclosure may start operating. However, in the embodiment, a specific condition, that is, when the container lid 20 closes the container body 10, the main body 30 may operate.

When the container lid 20 closes the container body 10 at S101 after the container body 10 is seated on the main body 30, the detection module 151 mounted on the upper end part of the container body 10 may detect the triggering member 210 mounted inside a side surface of the upper end part of the container lid 20.

When the container lid 20 closes the container body 10, the triggering member 210 mounted inside the side surface of the upper end part of the container lid 20 may approach the detection module 151 within a predetermined distance.

Accordingly, when the triggering member 210 approaches the detection module 151 within a predetermined distance, the switch 151a of the detection module 151 may be changed to a turn-on state from a turn-off state at S103.

As described above, when the switch 151a is changed to the turn-on state from the turn-off state, the second induction coil 201 and the switch 151a may form a closed circuit, so inductive coupling between the first induction coil 101 and the second induction coil 201 may be performed at S105.

To this end, the power supply part 103 may apply current to the first induction coil 101. Accordingly, a magnetic field may be generated in the first induction coil 101, and an induced electromotive force may be generated in the second induction coil 201 by such a magnetic field at S107.

Accordingly, a magnetic field may be generated in the second induction coil 201 by the induced electromotive force at S109. Accordingly, the magnetic sensor 107 may sense the magnetic field of the second induction coil 201 at S111.

Of course, the magnetic sensor 107 may also sense the magnetic field of the first induction coil 101.

The magnetic sensor 107 may transmit a magnetic field sensing signal to the controller 104. Accordingly, the controller 104 may receive the magnetic field sensing signal and may detect the change of the magnetic field at S113.

When the controller 104 detects the change of the magnetic field, the main body 30 may detect the closure of the container lid of the container body 10 at S115.

Accordingly, when inductive coupling between the first and second induction coils 101 and 201 is performed due to the closure of the container lid 20 of the container body 10, the magnetic sensor 107 may sense a magnetic field generated in the second induction coil 201 such that the controller 104 can detect the closure of the container lid 20.

Figure 16:
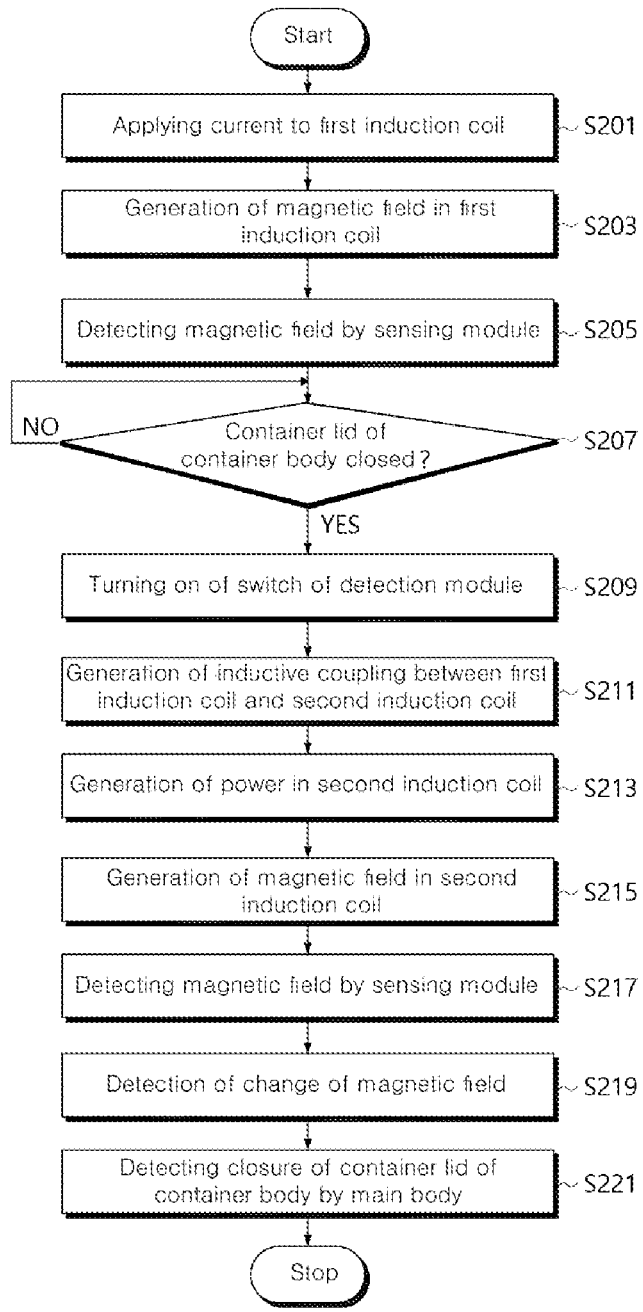
FIG. 16 is a flowchart illustrating a process of detecting the closure of a container lid in a main body according another embodiment of the present disclosure.

FIG. 16 is a flowchart illustrating the process of detecting the closure of the container lid in the main body according to another embodiment of the present disclosure.

Referring to FIG. 16, in the blender 1, when current is applied to the first induction coil 101 in a state in which the container body 10 is seated on the main body 30 at S201, a magnetic field may be generated in the first induction coil 101 by the applied current at S203.

In this case, the magnetic sensor 107 may sense the magnetic field of the first induction coil 101 at S205.

Next, whether the container lid 20 closes the container body 10 may be determined at S207. Whether the container lid 20 closes the container body 10 may be determined according to whether the detection module 151 provided in the upper end part of the container body 10 detects the triggering member 210 installed inside a side surface of the upper end portion of the container lid 20.

Due to the closure of the container lid 20 of the container body 10, the triggering member 210 mounted inside a side surface of the upper end part of the container lid 20 may approach the detection module 151 within a predetermined distance.

Accordingly, when the triggering member 210 approaches the detection module 151 within a predetermined distance due to the closure of the container lid, the switch 151a of the detection module 151 may be changed from a turn-off state to a turn-on state at S209.

As described above, when the switch 151a is changed from the turn-off state to the turn-on state, the second induction coil 201 and the switch 151a may form a closed circuit, so inductive coupling between the first induction coil 101 and the second induction coil 201 may be performed at S211.

Due to such an inductive coupling, the induced electromotive force may be generated in the second induction coil 201 at S213.

A magnetic field may be generated in the second induction coil 201 by the induced electromotive force at S215. Accordingly, the magnetic sensor 107 may sense the magnetic field of the second induction coil 201 at S217.

In this case, while sensing the magnetic field of the first induction coil 101 described above, the magnetic sensor 107 may also sense the magnetic field of the second induction coil 201.

The magnetic sensor 107 may transmit the magnetic field sensing signal to the controller 104. Accordingly, the controller 104 may detect the change of a magnetic field by receiving the magnetic field sensing signal at S219. That is, when the magnetic field of the second induction coil 201 is detected in a state in which the magnetic field of the first induction coil 101 is not detected, or when the magnetic field of the second induction coil 201 is additionally detected after the magnetic field of the first induction coil 101 is detected, the change of the detected magnetic field may be generated.

When the controller 104 detects the change of a magnetic field by using the magnetic field detected by the magnetic sensor 107, the main body 30 may detect the closure of the container lid of the container body 10 at S221.

Accordingly, when inductive coupling between the first and second induction coils 101 and 201 is performed due to the closure of the container lid 20 of the container body 10, the magnetic sensor 107 may detect a magnetic field generated in the second induction coil 201 such that the controller 104 can detect the closure of the container lid 20.

The embodiments of the present disclosure have been described above with reference to the accompanying drawings, but the blender of the present disclosure is not limited to the above embodiments and may be manufactured in a variety of different forms. Those skilled in the art to which the present disclosure belongs will understand that the blender of the present disclosure may be embodied in other specific forms without changing the spirit or essential features of the present disclosure. Therefore, it should be understood that the embodiments described above are illustrative in all respects and not restrictive.

The invention claimed is:

1. A blender comprising:
a main body comprising a first induction coil and a magnetic sensor;
a container body comprising a second induction coil,
a container lid having a triggering member installed inside a side surface thereof, and
a cover,
wherein an inductive coupling between the first induction coil and the second induction coil is selectively allowed in a state that the container body is seated on the main body, and the magnetic sensor detects a change of a magnetic field generated in the first induction coil or the second induction coil based on power generated due to the inductive coupling between the first induction coil and the second induction coil,
wherein the container body comprises a detection module configured to detect the triggering member,
wherein the detection module is electrically connected to the second induction coil through a transparent conductive member disposed in a longitudinal direction of the container body from an upper part of the container body to a lower part thereof, and
wherein the second induction coil is patterned on a printed circuit board (PCB), the PCB is attachable and detachable from the container body, and the transparent conductive member is attachable and detachable from the PCB,
wherein the cover is configured to hold and protect the PCB and has an opening to receive the transparent conductive member, and the transparent conductive member is attachably and detachably coupled to a connector at the PCB exposed through the opening of the cover.

2. The blender of claim 1, wherein due to the inductive coupling between the first induction coil and the second induction coil, a voltage is generated in the second induction coil, and due to the voltage generated in the second induction coil, a magnetic field is generated in a surrounding area of the second induction coil.

3. The blender of claim 1, wherein the main body comprises a motor, and the motor is operable in a state that the magnetic sensor detects the change of the magnetic field of the first induction coil or the second induction coil.

4. The blender of claim 3, wherein the magnetic sensor comprises a Hall sensor.

5. The blender of claim 3, comprising a controller, wherein in a state that the magnetic sensor detects the change of the magnetic field of the first induction coil or the second induction coil, the magnetic sensor transmits a signal to the controller to indicate that the motor can be driven.

6. The blender of claim 1, wherein the first and second induction coils are parallel to each other to face each other such that the first and second induction coils have the same center points in a state that the container body is seated on the main body.

7. The blender of claim 1, wherein the inductive coupling between the first induction coil and the second induction coil is allowed when the container lid closes the container body.

8. The blender of claim 7, wherein in a state that the container lid closes the container body, the detection module detects the triggering member, and the inductive coupling between the first and second induction coils is allowed.

9. The blender of claim 8, wherein the detection module comprises:
a switch turned on by the triggering member,
wherein in a state the triggering member is within a predetermined distance of the switch according to the container lid closing the container body, the switch is turned on, so that the inductive coupling between the first and second induction coils is allowed.

10. The blender of claim 9, wherein the switch is a reed switch and the triggering member is a magnetic body.

11. The blender of claim 1, wherein the conductive member comprises a transparent electrode film, wherein a first end of the transparent electrode film is electrically connected to the detection module by a first connector which is detachable from the transparent electrode film, and a second end of the transparent electrode film is electrically connected to the second induction coil by a second connector which is detachable from the transparent electrode film.

12. The blender of claim 11, wherein the first connector comprises a protrusion from the switch to receive the first end of the transparent electrode film.

13. The blender of claim 11, wherein the second connector comprises a protrusion from the PCB to receive the second end of the transparent electrode film.

14. The blender of claim 1, wherein the second induction coil and a switch are connected in series to each other, and in a state that the switch is turned on, the second induction coil and the switch form a closed circuit.

15. The blender of claim 1, wherein the first and second induction coils are patterned on another PCB and the PCB, respectively, and are wound multiple times on the same planes as the another PCB and PCB, respectively, in spiral shapes relative to center points of the first and second induction coils.

16. The blender of claim 15, wherein in a state that the container body is seated on the main body, the another PCB and the PCB are parallel to each other to face each other, and are disposed such that the first and second induction coils patterned on the another PCB and the PCB, respectively, have the same center points.

17. The blender of claim 1, wherein the container body comprises a handle, and the transparent conductive member is configured to extend into the handle to connect with the detection module disposed in a space at the handle.

18. The blender of claim 1, comprising a lower plate on which the PCB is mounted, and the cover is coupled to the lower plate.

19. The blender of claim 1, wherein the detection module is electrically connected to the second induction coil through the transparent conductive member disposed on an outer surface facing outside of the container body in the longitudinal direction of the container body from the upper part of the container body to the lower part thereof, and coated with a transparent coating material such that the transparent conductive member is protected from the outside.

* * * * *